(12) United States Patent
Koch et al.

(10) Patent No.: US 11,856,937 B2
(45) Date of Patent: Jan. 2, 2024

(54) APPARATUS FOR WEED CONTROL

(71) Applicant: Discovery Purchaser Corporation, Wilmington, DE (US)

(72) Inventors: Rainhard Koch, Kleinmachnow (DE); Jerry Outram, Kent (GB)

(73) Assignee: DISCOVERY PURCHASER CORPORATION, Wilmington, DE (US)

( * ) Notice: Subject to any disclaimer, the term of this patent is extended or adjusted under 35 U.S.C. 154(b) by 208 days.

(21) Appl. No.: 16/628,592

(22) PCT Filed: Jul. 2, 2018

(86) PCT No.: PCT/EP2018/067782
§ 371 (c)(1),
(2) Date: Jan. 3, 2020

(87) PCT Pub. No.: WO2019/007892
PCT Pub. Date: Jan. 10, 2019

(65) Prior Publication Data
US 2020/0214281 A1 Jul. 9, 2020

(30) Foreign Application Priority Data

Jul. 6, 2017 (EP) .................................... 17180030
Jul. 17, 2017 (EP) .................................... 17181582
(Continued)

(51) Int. Cl.
*A01M 21/04* (2006.01)
*A01M 7/00* (2006.01)
(Continued)

(52) U.S. Cl.
CPC ............ *A01M 21/043* (2013.01); *A01M 7/00* (2013.01); *E01H 11/00* (2013.01); *G05B 15/02* (2013.01);
(Continued)

(58) Field of Classification Search
CPC .... A01M 21/043; A01M 21/04; A01M 21/02; A01G 2013/004; A01G 13/0262
See application file for complete search history.

(56) References Cited

U.S. PATENT DOCUMENTS

| 213,255 | A | * | 3/1879 | Simpson | ................. B60S 1/488 |
| | | | | | 239/173 |
| 3,125,294 | A | * | 3/1964 | Lill | .................... A01G 13/0287 |
| | | | | | 239/428 |

(Continued)

FOREIGN PATENT DOCUMENTS

| CN | 1088225 A | * | 6/1994 | ............... B29D 7/01 |
| CN | 1088225 A | | 6/1994 | |

(Continued)

OTHER PUBLICATIONS

European Search Report dated Dec. 22, 2017 for European Application No. EP17187259, filed Aug. 22, 2017, 3 pages.
(Continued)

*Primary Examiner* — Tien Q Dinh
*Assistant Examiner* — William L Gmoser
(74) *Attorney, Agent, or Firm* — McBee, Moore & Vanik IP, LLC

(57) ABSTRACT

The present invention relates to an apparatus for weed control. It is described to provide (210) a processing unit with at least one image of an environment. The processing unit analyses (220) the at least one image to determine at least one location within the environment for activation of at least one mulch application unit. The at least one mulch
(Continued)

application unit is configured to apply at least one mulch to the at least one location for weed control. An output unit outputs (230) information that is useable to activate the at least one mulch application unit.

20 Claims, 9 Drawing Sheets

(30) Foreign Application Priority Data

Aug. 16, 2017 (EP) .................................... 17186467
Aug. 22, 2017 (EP) .................................... 17187259

(51) Int. Cl.

| | | |
|---|---|---|
| *E01H 11/00* | (2006.01) | |
| *G06T 7/70* | (2017.01) | |
| *G05B 15/02* | (2006.01) | |
| *G06T 7/00* | (2017.01) | |
| *G06V 20/56* | (2022.01) | |
| *G06V 20/10* | (2022.01) | |
| *G06F 18/24* | (2023.01) | |
| *H04N 23/54* | (2023.01) | |
| *E01H 8/10* | (2006.01) | |
| *A01M 9/00* | (2006.01) | |

(52) U.S. Cl.
CPC ............ *G06F 18/24* (2023.01); *G06T 7/0008* (2013.01); *G06T 7/70* (2017.01); *G06V 20/188* (2022.01); *G06V 20/56* (2022.01); *H04N 23/54* (2023.01); *G06T 2207/30188* (2013.01)

(56) References Cited

U.S. PATENT DOCUMENTS

| | | | | | |
|---|---|---|---|---|---|
| 4,908,981 | A | * | 3/1990 | Moore ................ | A01M 21/043 47/1.7 |
| 5,695,301 | A | * | 12/1997 | Higgins ............. | A01G 13/0262 71/15 |
| 6,029,395 | A | * | 2/2000 | Morgan ............. | A01G 13/0262 47/9 |
| 6,073,859 | A | * | 6/2000 | Gorgens ................ | A01M 21/04 239/128 |
| 6,479,468 | B1 | * | 11/2002 | Hedlund .............. | A61K 31/721 514/60 |
| 7,337,602 | B1 | * | 3/2008 | Butler ................ | A01D 34/005 56/320.2 |
| 9,504,242 | B2 | | 11/2016 | Hobbs et al. | |
| 11,377,806 | B2 | | 7/2022 | Day et al. | |
| 11,560,680 | B2 | | 1/2023 | BaßFeld et al. | |
| 2008/0319673 | A1 | | 12/2008 | Welty et al. | |
| 2012/0101861 | A1 | | 4/2012 | Lindores | |
| 2014/0103138 | A1 | | 4/2014 | Hobbs et al. | |
| 2015/0027040 | A1 | | 1/2015 | Redden | |
| 2015/0027043 | A1 | | 1/2015 | Redden | |
| 2015/0027044 | A1 | * | 1/2015 | Redden ................ | A01M 21/04 47/58.1 R |
| 2017/0024870 | A1 | | 1/2017 | Reichhardt | |
| 2017/0032258 | A1 | * | 2/2017 | Miresmailli ........... | G06N 20/00 |
| 2017/0066459 | A1 | | 3/2017 | Singh | |

FOREIGN PATENT DOCUMENTS

| | | | |
|---|---|---|---|
| CN | 1633536 | A | 6/2005 |
| CN | 2759191 | Y | 2/2006 |
| CN | 101151418 | A | 3/2008 |
| CN | 101707992 | A | 5/2010 |
| CN | 101927220 | A | 12/2010 |
| CN | 101961003 | A | 2/2011 |
| CN | 102172233 | A | 9/2011 |
| CN | 103348964 | A | 10/2013 |
| CN | 103354716 | A | 10/2013 |
| CN | 103718684 | A | 4/2014 |
| CN | 104521929 | A | 4/2015 |
| CN | 105379460 | A | 3/2016 |
| EP | 1321037 | A2 | 6/2003 |
| EP | 2848121 | A1 | 3/2015 |
| GB | 1419429 | A | 12/1975 |
| JP | 52-1729 | U | 1/1977 |
| JP | 2008092917 | A | 4/2008 |
| KR | 101031365 | B1 | 4/2011 |
| RU | 2129785 | C1 | 5/1999 |
| WO | WO2013072887 | A2 | 5/2013 |
| WO | WO2015013723 | A2 | 1/2015 |
| WO | 2016191825 | A1 | 12/2016 |
| WO | WO2016191825 | A1 | 12/2016 |
| WO | 2017002093 | A1 | 1/2017 |
| WO | 2017077543 | A1 | 5/2017 |

OTHER PUBLICATIONS

International Search Report and Written Opinion dated Aug. 24, 2018 for International Application No. PCT/EP2018/067782, filed Jul. 2, 2018, 17 pages.
Chinese Second Office Action, dated Feb. 22, 2022, Application No. or Patent No. 201880045260.7 (English translation only), 12 pages.
Herrera, Pedro Javier, José Dorado, and Ángela Ribeiro. "A novel approach for weed type classification based on shape descriptors and a fuzzy decision-making method." Sensors 14, No. 8 (2014): 15304-15324.
Gerhards, Roland, and Horst Oebel. "Practical experiences with a system for site-specific weed control in arable crops using real-time image analysis and GPS-controlled patch spraying." Weed research 46, No. 3 (2006): 185-193.
Donizeti A. Fornarolli et al. "Influence of mulch on the behavior of the herbicide atrazine". Planta Daninha, v. 16, n. 2, 1998. Planta Daninha, Publicação de: Sociedade Brasileira da Ciência das Plantas Daninhas, Brazil. With English Summary.
Fi Pastana "Effect of herbicide retention by soil mulch on weed control and corn production with minimum tillage". vol. 31 Aug. 1972 No. 22. Boletim Cientifico do Instituto Agronomico do Estado de S. Paulo. Brazil. With English Summary.

\* cited by examiner

APPARATUS FOR WEED CONTROL

CROSS-REFERENCE TO RELATED APPLICATIONS

This application is a national stage application under 35 U.S.C. § 371 of International Application No. PCT/EP2018/067782, filed internationally on Jul. 2, 2018, which claims priority benefit to European Application Nos. 17180030.3, filed Jul. 6, 2017, 17181582.2, filed Jul. 17, 2017, 17186467.1, filed Aug. 16, 2017, and 17187259.1, filed Aug. 22, 2017.

FIELD OF THE INVENTION

The present invention relates to an apparatus for weed control, to a system for weed control, to a method for weed control, as well as to a computer program element and a computer readable medium.

BACKGROUND OF THE INVENTION

The general background of this invention is weed control. Certain industrial areas and areas around railway tracks need to have the vegetation controlled. For railways, such control improves visibility from the perspective of people on the train such as the driver and improves visibility from the perspective of people working on the tracks. Such control can lead to improved safety. Additionally, vegetation can disrupt or damage tracks and associated signaling and communication lines. Control of the vegetation is then required to mitigate this. Vegetation control, also called weed control, can be very time and resource consuming, especially if carried out manually. A weed sprayer train, with a herbicide contained in chemical tanks on the train can be sprayed onto the track and surrounding area to control the vegetation. However, such weed control can be expensive, and the general public increasingly wishes to see a reduction in environmental impact.

SUMMARY OF THE INVENTION

It would be advantageous to have improved apparatus for weed control.

The object of the present invention is solved with the subject matter of the independent claims, wherein further embodiments are incorporated in the dependent claims. It should be noted that the following described aspects and examples of the invention apply also for the apparatus for weed control, the system for weed control, the method for weed control, and for the computer program element and the computer readable medium.

According to a first aspect, there is provided an apparatus for weed control, comprising:

an input unit;
a processing unit; and
an output unit.

The input unit is configured to provide the processing unit with at least one image of an environment. The processing unit is configured to analyse the at least one image to determine at least one location within the environment for activation of at least one mulch application unit. The at least one mulch application unit is configured to apply at least one mulch to the at least one location for weed control. The output unit is configured to output information useable to activate the at least one mulch application unit.

In other words, an image or images of an environment have been acquired. There is a mulch application unit or a number of mulch application units that can apply a mulch on and over the ground at one or more locations determined from image analysis of those image(s). In a similar way to how mulches are used, for example, in a garden environment the mulch can inhibit the growth of weeds, and control weeds including killing them.

In this way, weeds in the environment can be controlled in areas on the basis of image analysis, enabling the mulch to be applied only where it is required. For example, in areas of the environment such as concrete areas, tarmac areas, at locations of metal and or wooded railway track sleepers, at the location of the metal railway track, it can be determined that the mulch should not be deposited because weeds cannot or generally do not grow in these areas. In this way, less mulch is used and the environmental impact of the mulch is reduced. Also, it can be determined on the basis of image analysis where the mulch should be applied in addition to or in contrast to determining where it should not be deposited, such as determining a location or locations of weeds and the mulch deposited at that location. Again, this enables the mulch to be applied only where required, with cost, time and environmental impact advantages accruing.

Thus, a mulch, which can act as a physical barrier and generally be used to kill weeds, can be applied where it is needed for weed control in the environment.

Also, on the basis of image analysis, different mulches can be applied at different areas. For example, where there is a weed a particular type, a particular type of mulch can be applied. The type of mulch being applied can be different for different types of weeds that have been determined on the basis of image processing. Also, areas that may not have weeds but are determined to require the application of mulch, for example being an area determined to be susceptible to weed growth, can have a specific mulch applied that is different to a mulch that is applied for example over a weed. Thus areas that are near to weeds, or areas of ground that are otherwise determined to be susceptible to weed growth such as being at a location where it appears from image analysis that weeds would grow, with the ground not being dry and barren, a mulch can be applied that acts as a physical barrier. This can act to stop seeds that subsequently fall from germinating and growing, because they cannot access the ground beneath the mulch, and seeds under the mulch that would have grown are now stopped from growing and killed due to the mulch acting as a physical barrier.

In an example, the at least one image was acquired by at least one camera. The input unit is configured to provide the processing unit with at least one location associated with the at least one camera when the at least one image was acquired.

The location can be a geographical location, with respect to a precise location on the ground, or can be a location on the ground that is referenced to a position or positions of mulch application units. In other words, an absolute geographical location can be utilized or a location on the ground that need not be known in absolute terms, but that is referenced to a location of the mulch application units. Thus, by correlating an image with the location where it was acquired, the mulch can be accurately applied to that location. In an example, at least one of the at least one mulch contains at least one herbicide.

Thus in addition to providing a physical barrier in the form of a mulch, one or a number of mulches can as well as providing a physical barrier also provide a herbicide where it is required for weed control. Thus a mulch containing a herbicide can be applied at one location, where for example it has been determined that there is a weed that can be controlled by a combination of a mulch as a physical barrier in addition to a herbicide applied to that weed. Also, at other locations a mulch that does not have a herbicide, but only provides a physical barrier for weed control can be used, for example applying to an area where there may not yet be a weed. Thus, the most effective and appropriate mulch can be applied for each location, savings costs, time and minimising the environmental impact of herbicides.

In an example, a first mulch of the at least one mulch that contains at least one herbicide contains a different herbicidal content to a second mulch of the at least one mulch that contains at least one herbicide.

In other words, in addition to having a mulch that does not have any herbicidal content and only provides physical barrier weed control, another mulch can provide physical barrier weed control and specific weed control provided by a specific herbicidal content (directed for example to a specific weed or weeds). And another mulch in addition to providing physical barrier weed control can provide a different specific weed control provided by a different specific herbicidal content (directed for example to a different specific weed or weeds).

In an example, the at least one mulch that contains at least one herbicide comprises a biodegradable polymer. The biodegradable polymer can be degraded by at least one type of bacteria.

In this way, a herbicide or herbicides can be delivered only when needed. Thus, a herbicide is encapsulated in a biodegradable polymer. A bacteria then degrades the polymer to release the herbicide. The bacteria only grows when the weed is growing, and thus when weeds are not growing for example when the weather is cold and dry the bacteria do not degrade the polymer to release the herbicide. However, when the weather changes to being warm and wet or other conditions conducive for the growth of weeds, the bacteria grow also and degrade the polymer to release the herbicide. In this manner, a part of the ground can have mulch applied to it. There is no weed growing yet. The mulch provides a physical barrier to stop weed growth, but a particularly strong type of weed is still able to start to grow. However, due to bacteria activity the biodegradable polymer starts to degrade a releases a herbicide that kills the plant. Additionally, a plant could be covered by the mulch during a cold period and the physical barrier effect begins to control the plant, and mulch also degrades via bacterial activity to release the herbicide when it is required. By applying the mulch at locations on the basis of image processing, weed control is then provided where and when required. The mulch can also be in a form that degrades, for example via sunlight, to release the herbicide encapsulated within it.

However, the herbicide need not be encapsulated within the mulch and releasable via degradation of the mulch. The herbicide can form part of the mulch in terms of being immediately useable to control weeds upon application of the mulch over a weed. The mulch also need not be a biodegradable polymer when it contains a herbicide and can be any appropriate medium to hold the herbicide, enabling the active ingredient (herbicide) to be immediately useable to control weeds when applied over a weed.

In an example, analysis of the at least one image to determine the at least one location for activation of the at least one mulch application unit comprises a determination of at least one location of vegetation.

In other words, image processing can be used in order to determine the areas of vegetation in the acquired imagery, from which the most appropriate mulch can be determined for weed control of that vegetation area through application of the mulch at that location. Also, the mulch can be applied only at the locations of vegetation, where the most appropriate mulch can be used for each location of vegetation. Mulch can be provided centred at the location of vegetation, but extending beyond that location to provide enhanced protection relating to seeds/runners etc. Thus, the mulch can control the specific vegetation, but by covering an area centred at the location of the vegetation, seedlings or germinating seeds, or runners that will result in vegetation that have not yet been seen in acquired imagery can be covered by mulch and weed control provided.

In this manner, not only can mulch only be applied at areas and around areas of vegetation the most appropriate mulch can be selected for different vegetation areas, where different types of vegetation can be controlled through application of different mulches for example.

In an example, the processing unit is configured to determine a mode of operation of at least one chemical spray unit for spraying a weed control chemical at the at least location on the basis of the analysed at least one image. A time of spraying the weed control chemical is prior to a time of application of the at least one mulch. The output unit is configured to output information useable to activate the at least one chemical spray unit. Mode of application can mean the type of weed control chemical to be sprayed, the amount of weed control chemical to be sprayed, for example by varying a duration or flow rate of spraying.

In this manner, prior to applying a mulch, over for example a weed, a weed control chemical is sprayed over the weed. The mulch in addition to providing a physical barrier that helps to kill the weed also protects the weed control chemical from degrading, thereby increasing the efficacy of the weed control chemical, enabling less weed control chemical to be sprayed. The mulch also inhibits weeds from growing at that location, and by containing the weed control chemical the mulch also serves to minimise the environmental impact over and above less weed control chemical having to be sprayed in the first instance. Thus, a form of liquid chemical sandwich is provided that enhances weed control.

In an example, determination of the mode of operation comprises determining a weed control chemical to be sprayed from a plurality of weed control chemicals.

In an example, determination of the mode of operation comprises determining a duration of spraying of a weed control chemical to be sprayed.

In this way, the weed control chemical sprayed over a weed prior to application of the mulch can be targeted to the weed that has been determined to be at a location. Thus, the most effective weed control chemical can be used, and only the most aggressive chemicals used in optimized quantities as and when necessary, providing cost, and environmental advantages.

According to a second aspect, there is provided a system for weed control, comprising:
  at least one camera;
  an apparatus for weed control according to the first aspect and any associated example; and
  at least one mulch application unit.

The at least one camera is configured to acquire the at least one image of the environment. The at least one mulch application unit is mounted on a vehicle. The apparatus is configured to activate the at least one mulch application unit to apply the at least one mulch to the at least one location for weed control.

In this way, a vehicle can move around an environment and control weeds within that environment using one or more mulches at locations determined on the basis of imagery of that environment. In this way, imagery can be acquired by one platform, for example one or more drones that fly over an environment. That information is sent to an apparatus, that could be in an office. The apparatus determines what mulch should be applied where within the environment. This information, can be provided in a feature map and/or weed control map, that is provided to a vehicle that moves around that environment, and at specific parts of the environment the one or more mulches are applied.

In an example, the system comprises at least one chemical spray unit for spraying a weed control chemical at the at least location on the basis of the analysed at least one image. A time of spraying the weed control chemical is prior to a time of application of the at least one mulch.

In an example, the apparatus is mounted on the vehicle. In an example, the at least one camera is mounted on the vehicle.

In this manner, the system can operate in real time or quasi real time, by acquiring imagery, analysing it to determine what mulch to use where, and then activating the appropriate mulch activation unit at the required specific location.

In a third aspect, there is provided a method for weed control, comprising:
a) providing a processing unit with at least one image of an environment;
b) analysing by the processing unit the at least one image to determine at least one location within the environment for activation of at least one mulch application unit, wherein the at least one mulch application unit is configured to apply at least one mulch to the at least one location for weed control; and
d) outputting information by an output unit that is useable to activate the at least one mulch application unit.

In an example, the at least one image was acquired by at least one camera, and wherein step a) comprises providing the processing unit with at least one location associated with the at least one camera when the at least one image was acquired.

In an example, the method comprises step c) analysing by the processing unit the at least one image to determine a mode of operation of at least one chemical spray unit for spraying a weed control chemical at the at least location on the basis of the analysed at least one image. A time of spraying the weed control chemical is prior to a time of application of the at least one mulch, and step d) comprises outputting information useable to activate the at least one chemical spray unit.

According to another aspect, there is provided a computer program element for controlling an apparatus according to the apparatus of the first aspect and/or system according to the second aspect, which when executed by a processor is configured to carry out the method of the third aspect.

Advantageously, the benefits provided by any of the above aspects equally apply to all of the other aspects and vice versa.

The above aspects and examples will become apparent from and be elucidated with reference to the embodiments described hereinafter.

BRIEF DESCRIPTION OF THE DRAWINGS

Exemplary embodiments will be described in the following with reference to the following drawings.

DETAILED DESCRIPTION OF EMBODIMENTS

Figure 1:
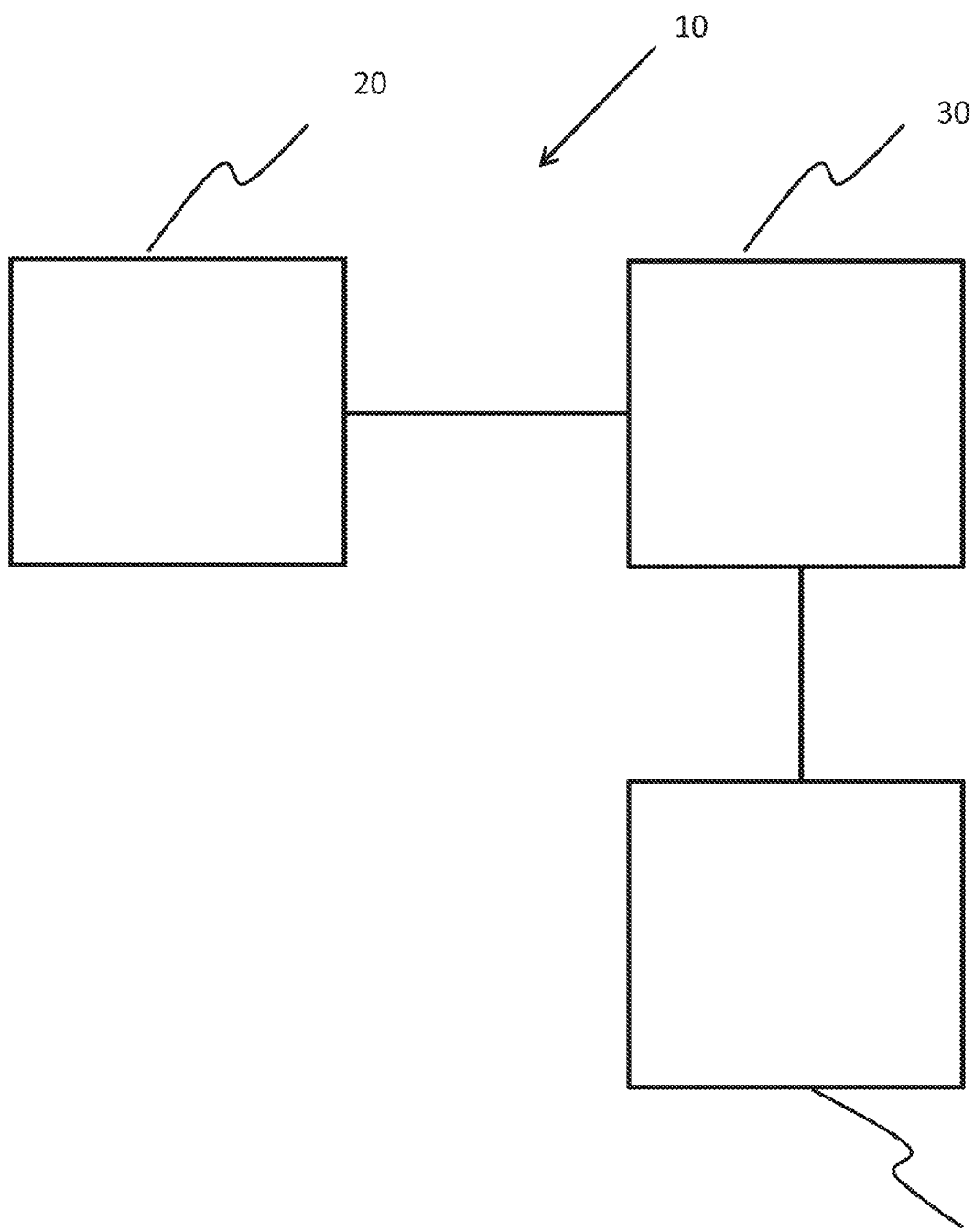
FIG. 1 shows a schematic set up of an example of an apparatus for weed control.

FIG. 1 shows an example of an apparatus 10 for weed control. The apparatus 10 comprises an input unit 20, a processing unit 30, and an output unit 40. The input unit 20 is configured to provide the processing unit 30 with at least one image of an environment. This is via wired or wireless communication. The processing unit 30 is configured to analyse the at least one image to determine at least one location within the environment for activation of at least one mulch application unit. The at least one mulch application unit is configured to apply at least one mulch to the at least one location for weed control. The output unit 40 is configured to output information useable to activate the at least one mulch application unit.

In an example, the apparatus is operating in real-time, where images are acquired and immediately processed and the at least one mulch application unit is activated to control weeds. Thus, for example a vehicle can acquire imagery of its environment and process that imagery to determine where a mulch should be applied in its environment.

In an example, the apparatus is operating in quasi real time, where images are acquired of an environment and immediately processed to determine where a mulch should be applied. That information can later be used by an appropriate system (or systems) that travel(s) within the environment and applies the mulch to particular parts of that environment. Thus for example, a first vehicle, such as a car, train, lorry or unmanned aerial vehicle (UAV) or drone equipped with one or more cameras can travel within an environment and acquire imagery. This imagery can be immediately processed to determine a "feature map" and/or a "weed map", detailing where within the environment specific locations should or should not have mulch applied, where features can be the locations of features where mulch should not be applied for example over a concrete or other area as discussed above, and where the weed map indicates the locations of weeds where the mulch should be applied. Later, a vehicle equipped with mulch application unit(s) can travel within the environment and apply the mulch to different specific areas of the environment.

In an example, the apparatus is operating in an offline mode. Thus, imagery that has previously been acquired is provided later to the apparatus. The apparatus then determines where mulch should be applied within an area, and in effect generates a weed map and/or feature map. The weed map and/or feature map is then used later by one or more vehicles that then travel within the area and apply mulch to specific parts of the environment.

In an example, the output unit outputs a signal that is directly useable to activate the mulch application unit(s).

In an example, the at least one mulch is applied in liquid form, and the at least one mulch application unit comprises at least one spray gun or nozzle.

In an example, the at least one mulch is applied in solid form. For example, in powder form, as a non woven fibre material or in the form of starch newspaper, with mulch applicators being used that are appropriate for application of such solid mulches.

According to an example, the at least one image was acquired by at least one camera. The input unit is configured to provide the processing unit with at least one location associated with the at least one camera when the at least one image was acquired.

In an example, the location is an absolute geographical location.

In an example, the location is a location that is determined with reference to the position or positions of the mulch application units. In other words, an image can be determined to be associated with a specific location on the ground, without knowing its precise geographical position, but by knowing the position of the mulch application units with respect to that location at the time the image was acquired, the required mulch can then be applied at a later time at that location by moving the appropriate mulch application unit to that location.

In an example, a GPS unit is used to determine, and/or is used in determining, the location of the at least one camera when specific images were acquired.

In an example, an inertial navigation unit is used alone, or in combination with a GPS unit, to determine the location of the at least one camera when specific images were acquired. Thus for example, the inertial navigation unit, comprising for example one or more laser gyroscopes, is calibrated or zeroed at a known location and as it moves with the at least one camera the movement away from that known location in x, y, and z coordinates can be determined, from which the location of the at least one camera when images were acquired can be determined.

In an example, image processing of acquired imagery is used alone, or in combination with a GPS unit, or in combination with a GPS unit and inertial navigation unit, to determine the location of the at least one camera when specific images were acquired. Thus visual markers can be used alone, or in combination with GPS derived information.

According to an example, at least one of the at least one mulch contains at least one herbicide.

According to an example, a first mulch of the at least one mulch that contains at least one herbicide contains a different herbicidal content to a second mulch of the at least one mulch that contains at least one herbicide.

In an example, a third mulch of the at least one mulch that contains at least one herbicide contains a different herbicidal content to both the first and second mulches of the at least one mulch that contains at least one herbicide. In an example, a fourth mulch of the at least one mulch that contains at least one herbicide contains a different herbicidal content to all of the first, second and third mulches of the at least one mulch that contains at least one herbicide.

According to an example, the at least one mulch that contains at least one herbicide comprises a polymer. In an example the polymer is a biodegradable polymer. In an example the biodegradable polymer is configured to be degraded by at least one type of bacteria.

In an example, the biodegradable polymer is a slow release formulation configured to be degraded by at least one type of bacteria.

In an example, the biodegradable polymer comprises a polyester. In this way, bacteria that exist for example in the soil and that grow when plants grow (when it is warm and wet) can degrade the biodegradable polymer, by attacking for example ester groups, to release a herbicide that is encapsulated within the biodegradable polymer.

In an example, the biodegradable polymer is Impranil DLN. In an example, the biodegradable polymer is polyactid acid. In an example, the biodegradable polymer is polycaprolacton.

In an example, the biodegradable polymer is in the form of sprayable granules, with the herbicide active ingredient encapsulated within granules.

In an example, the biodegradable polymer prior to application is in the form of a dispersion comprising the herbicide within an aqueous solution. In this way the aqueous solution can be delivered through spray technologies, and when sprayed on a weed the water evaporates to leave the herbicide encapsulated within the biodegradable polymer.

In an example, the biodegradable polymer is in the form of large granules that are delivered via a solid delivery system and not sprayed as such.

According to an example, analysis of the at least one image to determine the at least one location for activation of the at least one mulch application unit comprises a determination of at least one location of vegetation.

In an example, analysis of the at least one image to determine the at least one location for activation of the at least one mulch application unit comprises a determination of at least one type of weed.

In other words, the appropriate mulch can be selected to account for the type or types of weeds to be controlled. Thus for example, one type of weed may require a mulch that only provides a physical barrier and does not need any additional herbicidal content in order to kill that weed, but a different type of weed may require both the physical barrier effect and a specific type of herbicidal content, whilst a different type of weed requires both a physical barrier effect and a different herbicidal content to kill the weed.

In other words, image processing can be used to determine a type of weed and its location. The location can be the location within the imagery. The location can be an actual geographical location. The location can be within the imagery and be able to be referenced to a position of the vegetation control technology. In this manner, by determining a location of a particular type of weed, the most optimum mulch can be applied to that specific location, with this also applying to different weeds at different locations that required different mulches to be applied.

In an example, analysis of the at least one image comprises utilisation of a machine learning algorithm.

In an example, the machine learning algorithm comprises a decision tree algorithm.

In an example, the machine learning algorithm comprises an artificial neural network.

In an example, the machine learning algorithm has been taught on the basis of a plurality of images. In an example, the machine learning algorithm has been taught on the basis of a plurality of images containing imagery of at least one type of weed. In an example, the machine learning algorithm has been taught on the basis of a plurality of images containing imagery of a plurality of weeds.

According to an example, the processing unit is configured to determine a mode of operation of at least one chemical spray unit for spraying a weed control chemical at the at least location on the basis of the analysed at least one image. A time of spraying the weed control chemical is prior to a time of application of the at least one mulch. The output unit is configured to output information useable to activate the at least one chemical spray unit.

According to an example, determination of the mode of operation comprises determining a weed control chemical to be sprayed from a plurality of weed control chemicals.

Figure 2:
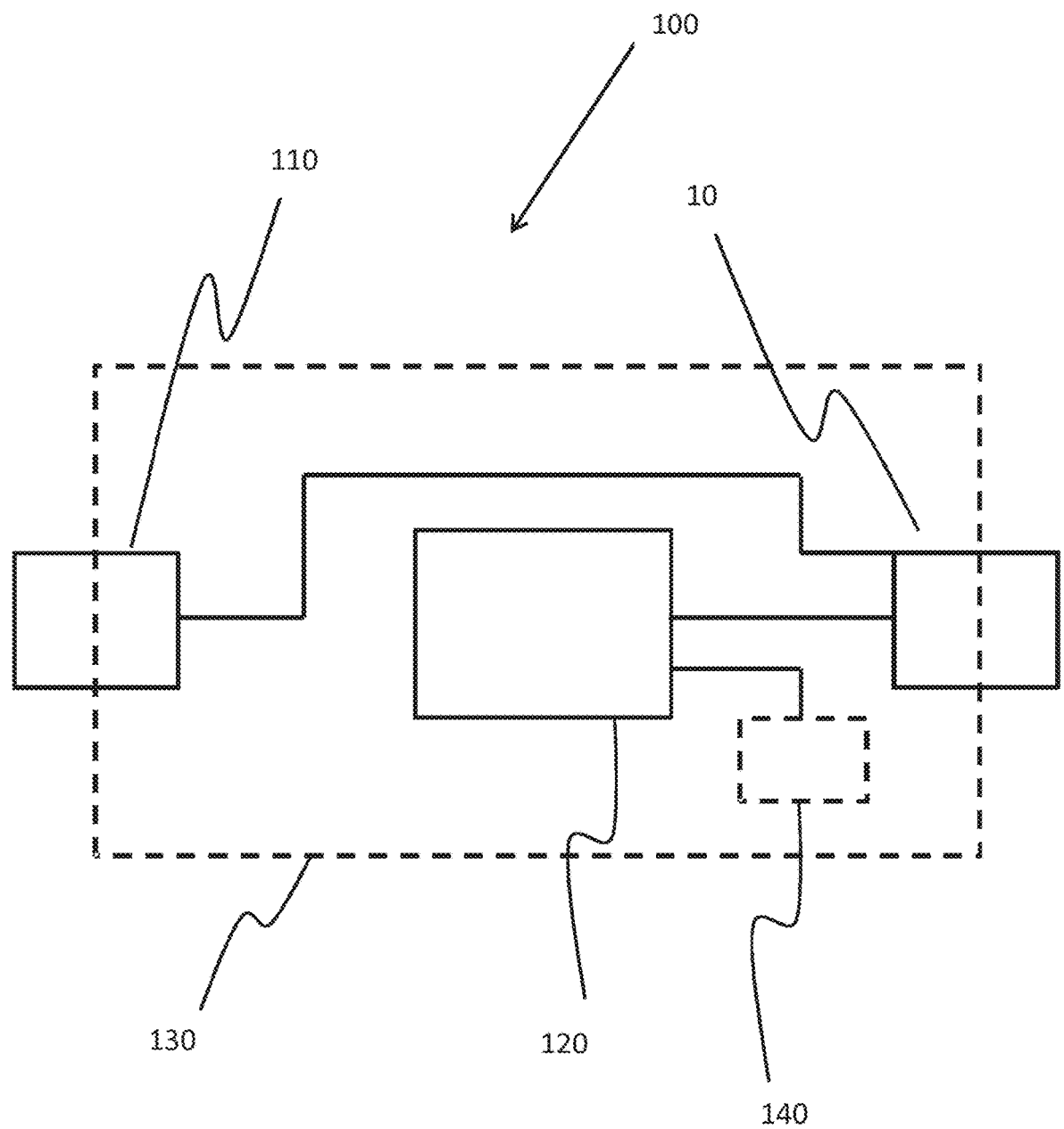
FIG. 2 shows a schematic set up of an example of a system for weed control.

FIG. 2 shows an example of a system 100 for weed control. The system 100 comprises at least one camera 110, an apparatus 10 for weed control as described with respect to FIG. 1 and any of the associated examples, and at least one mulch application unit 120. The at least one camera 110 is configured to acquire the at least one image of the environment. The at least one mulch application unit 120 is mounted on a vehicle 130. The apparatus 10 is configured to activate the at least one mulch application unit 120 to apply the at least one mulch to the at least one location for weed control.

According to an example, the system comprises at least one chemical spray unit 140 for spraying a weed control chemical at the at least one location on the basis of the analysed at least one image. A time of spraying the weed control chemical is prior to a time of application of the at least one mulch.

According to an example the apparatus is mounted on the vehicle, and in an example the at least one camera is mounted on the vehicle.

In an example, the vehicle is a train. In an example, the vehicle is a lorry or truck or Unimog.

In an example, the input unit is configured to provide the processing unit with at least one location associated with the at least one camera when the at least one image was acquired. In an example, the location is a geographical location.

In an example, the apparatus is configured to activate the vegetation control technology in the at least one mode of operation on the basis of the at least one geographical location associated with the at least one camera when the at least one image was acquired and a spatial relationship between the at least one camera and the vegetation control technology. In this manner, by knowing where the image has been acquired by a camera mounted on a vehicle and also knowing where a vegetation control technology is mounted on the vehicle with respect to the camera, it is simple to take into account the forward speed of the vehicle in order to activate that vegetation control technology at the same location where the image was acquired, and indeed within that imaged area.

In an example, the apparatus is configured to activate a first mode of a vegetation control technology before activation of a second mode of the vegetation control technology, or activate the first mode of the vegetation control technology after activation of the second mode of the vegetation control technology.

Figure 3:
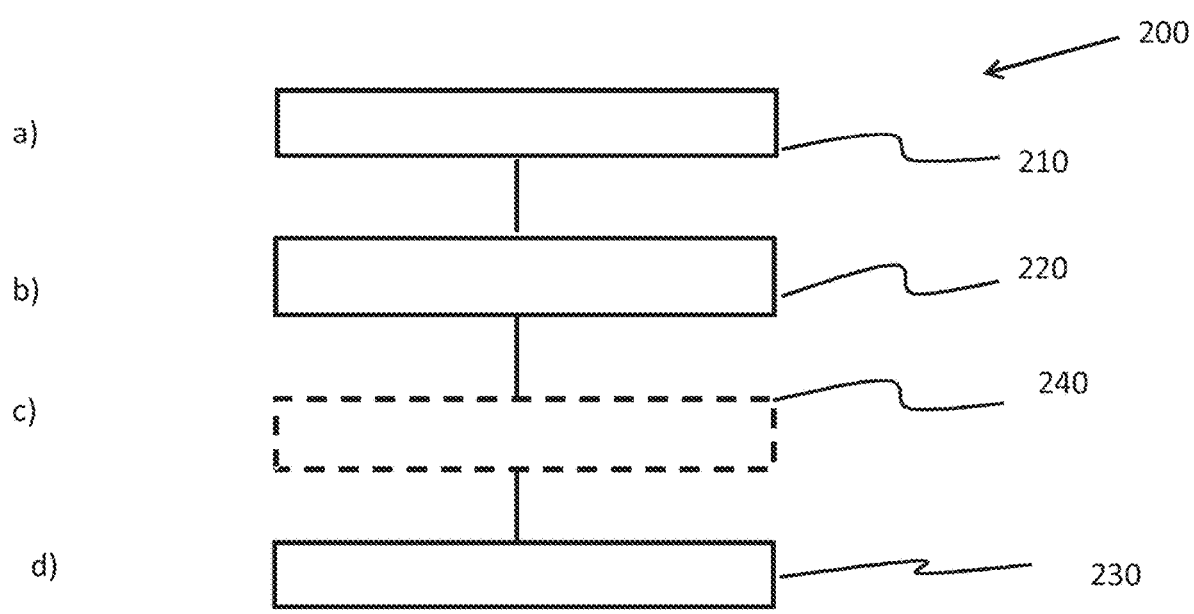
FIG. 3 shows a method for weed control.

FIG. 3 shows a method 200 for weed control in its basic steps. The method 200 comprises:
  in a providing step 210, also referred to as step a), providing a processing unit with at least one image of an environment;
  in an analyzing step 220, also referred to as step b), analysing by the processing unit the at least one image to determine at least one location within the environment for activation of at least one mulch application unit, wherein the at least one mulch application unit is configured to apply at least one mulch to the at least one location for weed control; and
  in an outputting step 230, also referred to as step d), outputting information by an output unit that is useable to activate the at least one mulch application unit.

According to an example, the at least one image was acquired by at least one camera, and step a) can comprise providing the processing unit with at least one location associated with the at least one camera when the at least one image was acquired.

In an example, at least one of the at least one mulch contains at least one herbicide.

In an example, a first mulch of the at least one mulch that contains at least one herbicide contains a different herbicidal content to a second mulch of the at least one mulch that contains a least one herbicide.

In an example, the at least one mulch that contains at least one herbicide comprises a polymer. In an example the polymer is a biodegradable polymer. In an example the biodegradable polymer is configured to be degraded by at least one type of bacteria.

In an example, step b) comprises a determination of at least one location of vegetation.

In an example, step b) comprises a determination of at least one type of weed.

According to an example, the method comprises step c) analysing 240 by the processing unit the at least one image to determine a mode of operation of at least one chemical spray unit for spraying a weed control chemical at the at least location on the basis of the analysed at least one image. A time of spraying the weed control chemical is prior to a time of application of the at least one mulch. Step d) then comprises outputting information useable to activate the at least one chemical spray unit.

In an example, step c) comprises determining a weed control chemical to be sprayed from a plurality of weed control chemicals.

Detailed examples of the apparatus, system and method for weed control are now described in more detail in conjunction with FIGS. 4-9, which relate to weed control in the environment of a railway track. A number of mulch application units 120 and chemical spray units 140 are mounted on part(s) of a train 130.

Figure 4:
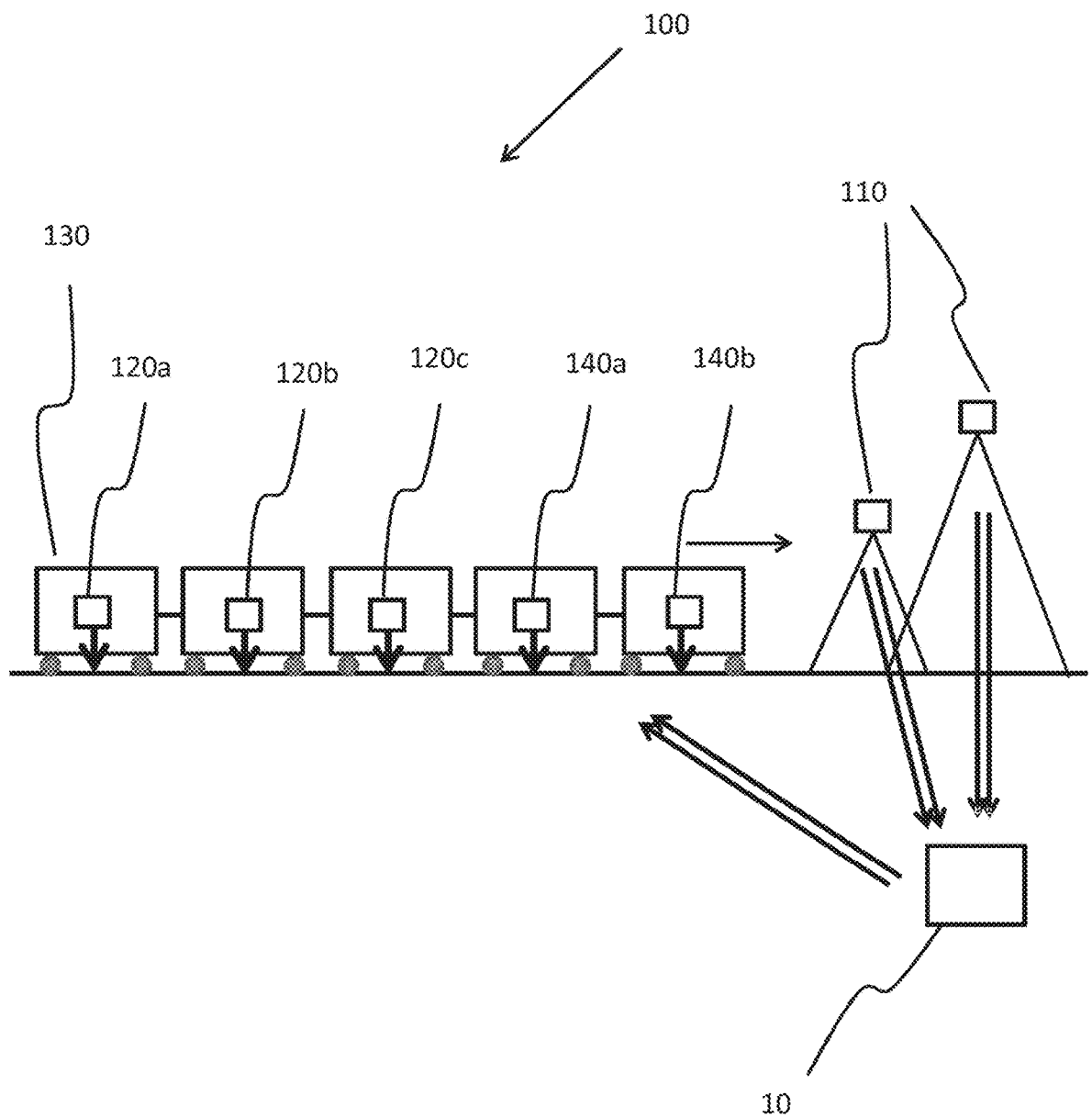
FIG. 4 shows a schematic set up of an example of a system for weed control.

FIG. 4 shows an example of a system 100 for weed control, where a number of mulch application units 120 and chemical spray units 140 are mounted on a train 130. In the system 100 several drones have cameras 110. The drones fly along a railway track. The cameras acquire imagery of the environment of the railway track, with this being the ground between the track and the ground to the sides of the track. The environment being imaged is that that is required to have weeds controlled. There need not be several drones, and one drone with one camera 110 can acquire the necessary imagery. Indeed, the imagery could have been acquired by a camera 110 or cameras 110 that were hand held by personnel visiting the railway track environment, by a plane, satellite or by a train that has run along the railway track for example. The imagery acquired by the cameras 110 is at a resolution that enables vegetation to be identified as vegetation and indeed can be at resolution that enables one type of weed to be differentiated from another type of weed. The acquired imagery can be colour imagery but need not be. The imagery acquired by the drones is transmitted to an apparatus 10. The imagery can be transmitted to the apparatus 10 as soon as it has been acquired by the cameras 110, or can be transmitted at a later time than when it was acquired, for example when the drones have landed. The drones can have Global Positioning Systems (GPS) and this enables the location of acquired imagery to be determined. For example the orientation of cameras 110 and the position of the drone when imagery was acquired can be used to determine the geographical footprint of the image at the ground plane. The drones can also have inertial navigation systems, based for example on laser gyroscopes. In addition to being used to determine the orientation of the drone and hence of the camera, facilitating a determination of where on the ground the imagery has been acquired, the inertial navigation systems can function alone without a GPS system to determine the position of the drone, by determining movement away from a known or a number of known locations.

An input unit 20 of the apparatus 10 passes the acquired imagery to a processing unit 30. Image analysis software operates on the processing unit 30. The image analysis software can use feature extraction, such as edge detection, and object detection analysis that for example can identify structures such as railway tracks, sleepers, trees, level crossings, station platforms. Thus, on the basis of known locations of objects, such as the locations of buildings and railway sleepers and points and level crossings within the environment, and on the basis of known structure information such as the distance between sleepers and the distance between the railway tracks, the processing unit can patch the acquired imagery to in effect create a synthetic representation of the environment that can in effect be overlaid over a geographical map of the environment. Thus, the geographical location of each image can be determined, and there need not be associated GPS and/or inertial navigation based information associated with acquired imagery. However, if there is GPS and/or inertial navigation information available then such image analysis, that can place specific images at specific geographical locations only on the basis of the imagery, is not required. Although, if GPS and/or inertial navigation based information is available then such image analysis can be used to augment the geographical location associated with an image. Thus for example, if on the basis of GPS and/or inertial navigation based information the centre of an acquired image is deemed to be located 22 cm from the side edge and 67 cm from the end of a particular railway sleeper of a section of railway, whilst from the actual acquired imagery, through the use of the above described image analysis, the centre of the image is determined to be located 25 cm from the edge and 64 cm from the end of the sleeper, then the GPS/inertial navigation based derived location can be augmented by shifting the location 3 cm in one direction and 3 cm in another direction as required.

The processing unit 30 runs further image processing software. This software analyses an image to determine the areas within the image where vegetation is to be found, and also analyses the imagery to determine where vegetation is not to be found (for example at the locations of railway sleepers and areas of concrete). This latter information can be used to determine where mulch is not required to be sprayed. Also, a determination can be made from image analysis as to what type of ground or soil type is to be found at a location, such as that conductive for plant growth. For example, a determination can be made that the ballast is clean, dry and does not have organic matter between separate pieces of ballast. Thus, if no vegetation is determined to be there, this area can be determined as not requiring a mulch applied because this area is not conducive for vegetation growth. However, if from image analysis the ballast is determined to not be clean, and/or dry and/or have organic matter between pieces of ballast, even though no vegetation is to be found at the moment the processing unit can still determine that a mulch should be applied at this location to control weeds, because this area has been determined to be an area conducive for the growth of vegetation. Vegetation can be detected based on the shape of features within acquired images, where for example edge detection software is used to delineate the outer perimeter of objects and the outer perimeter of features within the outer perimeter of the object itself; organic material between ballast can be detected in a similar manner. A database of vegetation imagery can be used in helping determine if a feature in imagery relates to vegetation or not, using for example a trained machine learning algorithm such as an artificial neural network or decision tree analysis. The camera can acquire multi-spectral imagery, with imagery having information relating to the colour within images, and this can be used alone, or in combination with feature detection to determine where in an image vegetation (and/or organic matter) is to be found. As discussed above, because the geographical location of an image can be determined, from knowledge of the size of an image on the ground, the location or locations of vegetation, and/or other areas where a mulch should be applied, can be found in an image and can then be mapped to the exact position of that vegetation (area) on the ground.

The processing unit 30 then runs further image processing software that can be part of the image processing that determines vegetation location on the basis of feature extraction, if that is used. This software comprises a machine learning analyser. Images of specific weeds are acquired, with information also relating to the size of weeds being used. Information relating to a geographical location in the world, where such a weed is to be found and information relating to a time of year when that weed is to be found, including when in flower etc. can be tagged with the imagery. The names of the weeds can also be tagged with the imagery of the weeds. The machine learning analyser, which can be based on an artificial neural network or a decision tree analyser, is then trained on this ground truth acquired imagery. In this way, when a new image of vegetation is presented to the analyser, where such an image can have an associated time stamp such as time of year and a geographical location such as Germany or South Africa tagged to it, the analyser determines the specific type of weed that is in the image through a comparison of imagery of a weed found in the new image with imagery of different weeds it has been trained on, where the size of weeds, and where and when they grow can also be taken into account. The specific location of that weed type on the ground within the environment, and its size, can therefore be determined.

The processing unit 30 has access to a database containing different weed types, and the optimum mulch, whether containing a herbicide or not, to be used in controlling that weed type and also whether a weed control chemical and what type of chemical should be sprayed on the weed before application of the mulch. This database has been compiled from experimentally determined data. The database also contains details relating to different ground areas, that may be in the location of weeds or that may be separate from weeds, and also whether a specific type of mulch should be applied on the ground to inhibit weeds from growing in that area.

Returning to the situation where a weed or area of vegetation has been determined to exist from image analysis, the size of the weed or clump of weeds on the ground can also be taken into account in determining what mulch is to be applied and whether it should contain a herbicide and whether a weed control chemical should also be applied or sprayed before application of the mulch at the location of the weed. For example, a specific type of mulch may be optimum for a particular type of weed. The processing unit 30 can then determine that for a single weed or a small clump of this weed at a particular location in the environment a number of mulch application units 120 should be activated at that specific location to control the weeds with that mulch—which for example could just be a physical barrier and contain no herbicide, which is applied by mulch application units 120a. However, if there is another type of weed then the processing unit can determine that a mulch containing one or more herbicides should be applied at that location, where the mulch is degradable via bacteria in order to release the herbicide at an appropriate time. Two different types of mulch having different herbicidal content can be deposited via mulch application units 120b and 120c. Additionally, a specific type of weed may have been identified at a location that is particularly difficult to control and/or lead to seedlings growing in the surround area and the processing unit can then determine that a specific weed control chemical should be sprayed at the location of the weed followed by application of a mulch that could also contain a herbicide, with this mulch potentially being applied over a larger area than the weed to control seedlings if they begin to grow. Two different types of weed control chemical can be sprayed via chemical spray units 140a and 140b. However, the mulch could just be applied over the same area over which the weed control chemical was sprayed and may not have contained within it a herbicide. Rather, a mulch without a herbicide can act as a physical barrier that in itself helps to control weeds and also being over the weed control chemical helps to ensure that the weed control chemical that was sprayed does not breakdown too quickly and/or get washed away by rain or otherwise be detrimentally affected, thereby the mulch also increases the efficacy of the weed control chemical. Thus in this example one of chemical spray units 140a or 140b activate when the appropriate truck of the train passes over the weed, and when the rearmost truck having mulch applications units 120a passes over the weed, these activate to apply a mulch over the weed that has already been sprayed with a weed control chemical. However, a mulch can be applied at a location without a weed control chemical having already been sprayed at that location.

The processing unit ensures that all weeds that need to be controlled, have assigned to them at least one activation of a mulch application unit and activation of a chemical spray unit if required; whether just a mulch without a herbicide, a mulch with a herbicide, a spraying of a weed control chemical followed by a mulch without a herbicide, or a spraying of a weed control chemical followed by a mulch with a herbicide is required. Regarding the mulches and weed control chemical to be sprayed, the processing unit can determine which particular herbicide should be contained in the mulch and which particular type of weed control chemical should be sprayed.

Thus, the cameras 110 of the drones acquire imagery of an environment that is passed to a processing unit 30 that determines what modes of a weed control technology should be applied at which specific geographical locations in the environment. Thus, in effect a feature map and/or weed map can be generated that indicates where within the environment mulch should be applied, with or without a herbicide contained within it, and whether this should be preceded by a weed control chemical being sprayed on the weed.

With continued reference to FIG. 4, the weed control train 130 progresses along the railway track. As discussed above, the weed control train has a number of trucks. In a specific example a first truck has a chemical spray based weed control technology with a number of chemical spray units 140b that spray a first weed control chemical. A second truck has a chemical spray based weed control technology with a number of chemical spray units 140a that spray a second weed control chemical. Then, one truck has a number of mulch application units 120c that apply a mulch having a first herbicide content, another truck has a number of mulch application units 120b that apply a mulch having a second herbicide content, and a final truck has a number of mulch application units 120a that apply a mulch having no herbicide content and that forms a physical barrier without an associated herbicidal weed control effect. A different train or the same train that has different trucks coupled to it, can house different numbers of mulch application units applying different types of mulches, with and without herbicidal content and need not have trucks with chemical spray units, where only mulches are applied in the environment, over weeds for example. However, when there are chemical spray units, there can be a number of different types of units coupled to appropriate chemical reservoirs housed within the trucks that can spray a number of different weed control chemicals. However, the trucks with the chemical spray units, if present, are always "upstream" of the trucks with the mulch application units with respect to a forward direction of the train such that a weed can be sprayed with a weed control chemical and then subsequently have a mulch applied over that area.

The weed control train has a processing unit (not shown) which uses the above discussed feature map, weed map or weed control map. The weed control train has means to determine its geographical location, which can be based on one or more of GPS, inertial navigation, image analysis in order to locate the position of the weed control train and the specific locations of the mulch application units 120a, 120b, 120c and the specific locations of the chemical spray units 140a and 140b. This means that when the weed control train passes through the environment the different units (mulch application units and if necessary chemical spray units) can be activated at the specific locations of weeds, where the different units to be activated at the location to apply specific mulches covering if necessary an area sprayed with a specific weed control chemical has been determined to be optimal for that task.

As discussed above, the weed control train can have a camera and acquire imagery. Acquired imagery can be processed by the processing unit on the weed control train to determine the location of the train itself, through determining the location of sleepers and features in the surroundings. Also, when the weed control train has a GPS and/or an inertial system, the GPS and/or inertial navigation systems can be used to determine the location of the train in order that the correct mulch application units (and if necessary chemical spray units) can be activated at the location of specific weeds. However, if the train also has a camera acquiring imagery of the surroundings, feature extraction such as the position of sleepers etc. can be used to augment the position determined by GPS and/or inertial navigation to make corrections in position in order that the mulch application units (and chemical spray units if necessary) can activate at the exact locations required, for example not over areas where weeds do not grow and for example at the specific locations of different types of weeds, to take into account for example a position derived from the GPS system. Thus, the image processing required to determine the positions of sleepers can run quickly, with location updates being applied rapidly, because the complexity of image processing in locating features such as railway sleepers is not relatively large.

A database of mulches with different herbicidal content and of weed control chemicals and information relating to what mulch to use to control specific types of weeds and also a combination of mulch preceded by a specific weed control chemical for control of other specific weeds is used by the processing unit to determine what units (mulch applications units and if necessary chemical spray units) are to be activated at specific locations in the environment. The train also has rain sensors, and if it is raining and a weed would normally only have a weed control chemical sprayed over it, the processing unit can determine that a mulch from mulch application units 120a with no herbicidal content should be applied over the weed after spraying of the weed control chemical to mitigate washing off of the weed control chemical due to rainfall by providing a physical barrier over the sprayed weed.

Figure 5:
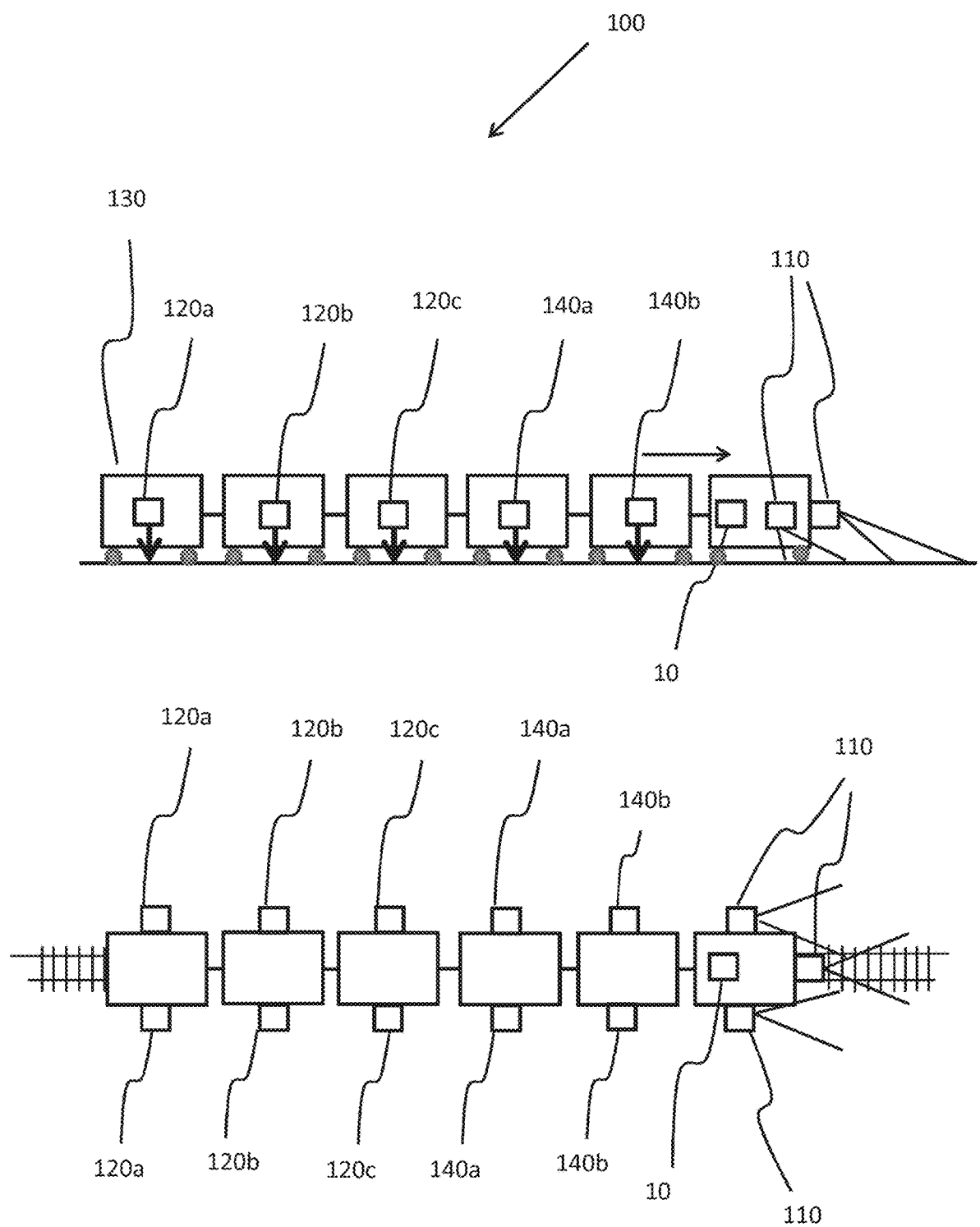
FIG. 5 shows a schematic set up of an example of a system for weed control.

FIG. 5 shows another example of a system 100 for weed control. The system for weed control of FIG. 5 is similar to that shown in FIG. 4. However, in FIG. 5 the weed control train 130 has cameras 110 and an apparatus 10 as previously discussed. The cameras 110 on the weed control train 130 now acquire that imagery that was previously acquired by the drones. The processing unit 30 of the apparatus on the weed control train 130 processes the acquired imagery to determine the location and type of weed. The exact geographical location of the weed is not then required to be determined. Rather, on the basis of a relative spacing between the cameras 110 and the mulch application units 120a, 120b, 120c and chemical spray units 140a and 140b housed in trucks of the train, an acquired image can be located at a specific point on the ground and weeds located and identified within that image and accordingly located on the ground. The required mulch application units (and if necessary also chemical spray units) can then be activated at the location of the weed being determined, and/or at the locations that are required to have weeds controlled relating to areas determined to be conducive for the growth of weeds. Then, from knowledge of the forward motion of the weed control train (its speed) and the time when an image was acquired, it can be determined when the required unit(s) should be activated such that activation is at the position of the weed (or other area), to apply mulch at that location with application of the mulch being preceded by a chemical spray if necessary, and/or to apply mulch over required other areas of the environment that may not require a weed control chemical to have already been sprayed at that location. In this way, the weed control train does not need to have a GPS and/or inertial navigation system or image based absolute geographical location determination means. Rather, to account for the processing required to determine the type of weed and its exact location within an image, and/or the locations where mulch is to be applied where they may not be a weed growing but where a mulch has still been determined as needing to be applied, and its exact location on the ground, within a train coordinate system, can be determined. The cameras 110 must be spaced from first truck housing mulch application units or chemical spray units if present, which for the example shown in FIG. 5 is the truck housing chemical spray units 140b where the important position of that truck is the position of the chemical spray units 140b themselves, by a distance that is at least equal to the processing time multiplied by the maximum velocity of the weed control train during weed control. Thus for example, if processing takes 0.2 s, 0.4 s, or 0.8 s for a train travelling at 25 m/s, with reference to FIG. 5 the cameras 110 must be spaced forward of chemical spray units 140b by 5 m, 10 m or 20 m for this train velocity. A reduction in train velocity and/or a reduction in processing speed enable the separation to be reduced. In addition, the cameras 110 that are acquiring the imagery can have very short exposure times in order that image smear due to movement of the train during the exposure time is minimized. This can be by various means, including the use of cameras with short exposure times or short pulsed illumination via for example lasers or LEDs in combination with filters for example.

However, the apparatus can use a GPS system and/or inertial navigation system and/or image analysis to determine an exact geographical location of weeds, and/or of areas where a mulch is to be applied that could for example be between sleepers and between railway tracks but not over sleepers or over the tracks and/or at areas determined to be conducive for weed growth. This means that a log of what weeds have been controlled, and how they have been controlled, and where those weeds were located can be provided, and a log of where mulch was applied including that that was not over a growing weed can be provided. Thus, in effect audit information is provided enabling the efficacy of application of weed control technologies to be reviewed. Also, by generating an exact geographical location of the weeds and/or other relevant areas of the environment, the mulch application units and chemical spray units can have associated location determining means, such as a GPS system and/or inertial navigation system and/or image based system that can be used to provide the exact position of those units. Thus, a front carriage of a train can have the image acquisition and analysis units that enable a weed control map to be constructed. The last few trucks of a train could then have mulch application units (and if necessary chemical spray units). These latter trucks could be spaced from the front carriage by many tens if not hundreds of metres by load carrying trucks. The absolute separation of the front carriage to the rear carriages could then vary as the train goes up and down hill, but because the trucks with the mulch application and chemical spray units know their exact locations and the exact locations of their respective units, when they have moved forwards to the position of a weed or areas of weeds of a particular type or other areas that are to have for example a mulch applied, the appropriate unit or units can be activated at that precise geographical location. This is because the exact geographical locations of the mulch application units and chemical spray units are known, enabling activation of those units when they pass over the exact geographical location of a weed or other area for weed control to be applied.

FIG. 5 shows two views of the weed control train 130, the top being a side view and the bottom showing a plan view. This shows the cameras 110 acquiring imagery that extends between the tracks and to the sides of the tracks. The individual trucks of the weed control train have the associated different mulch application units 120a, 120b and 120c and the chemical spray units 140a and 140b, as discussed with respect to FIG. 4, that can be activated at positions beneath the train and to the side of the train.

Figure 6:
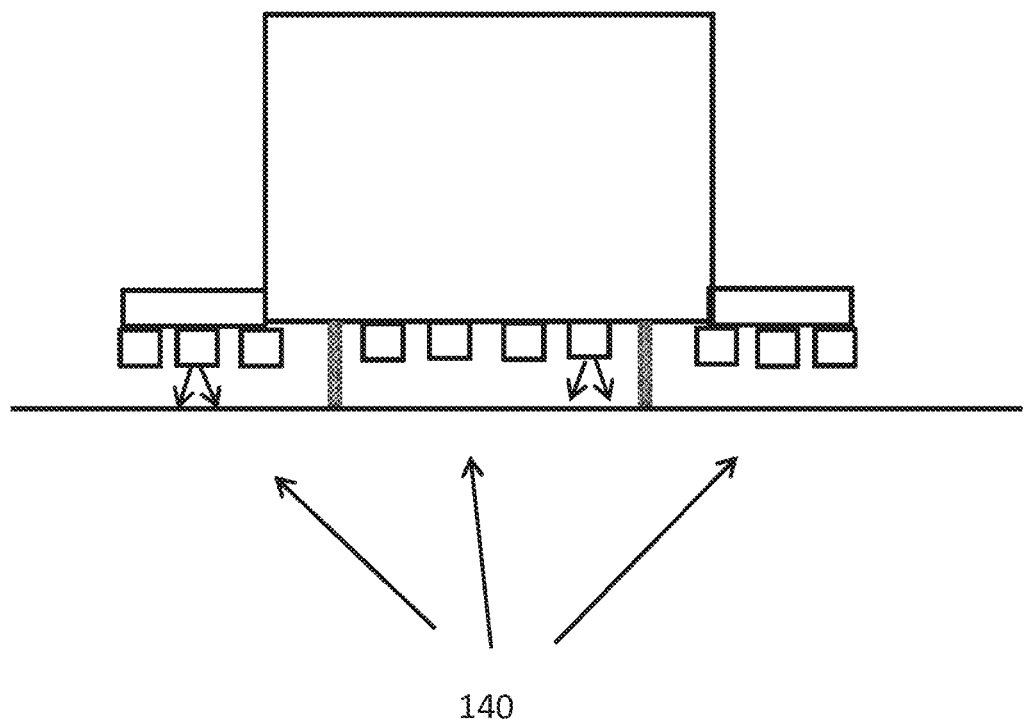
FIG. 6 shows a schematic set up of an example of a part of a system for weed control.

FIG. 6 shows a truck of a weed control train 130 as shown in FIGS. 4-5, that has a number of chemical spray units 140. The truck in FIG. 6 can be either the truck in FIGS. 4-5 that has the chemical spray units 140a or the chemical spray units 140b. In another example, the truck shown in FIG. 6 can spray a different weed control chemical to that discussed with respect to FIGS. 4-5. FIG. 6 shows a rear view of the truck of the train, with the view being that down the railway track. A number of separate spray nozzles of chemical spray units 140 extend laterally beneath the train and to the sides of the train. The spray nozzles can also extend in a forward direction. A spray nozzle can itself have specific control, outside of being on or off, and can be directionally controlled to spray to the left and to the right or downwards, and/or be controlled such that the angular extent of the spray is varied in order that for example a narrow jet of spray can be directed to a single small weed. When one of these spray nozzles passes over a weed that has been identified as one that should be controlled by that particular chemical spray the processing unit 30 activates the specific nozzle that sprays chemical at the specific location of the weed that is required to be controlled by that chemical spray. The weed control chemical is sprayed prior to a following mulch application at or over that location, discussed in more detail with respect to FIG. 7. In FIG. 6 there are two specific locations of such a weed, one to be found between the track and one to the left of the tracks, and accordingly two spray nozzles have been activated. It is to be noted that weeds can pass under this truck that have already had one of the other chemicals applied by chemical spray units 140 housed in a different truck or weeds that have been determined to not need a weed control chemical sprayed over them before a mulch is applied over them.

Figure 7:
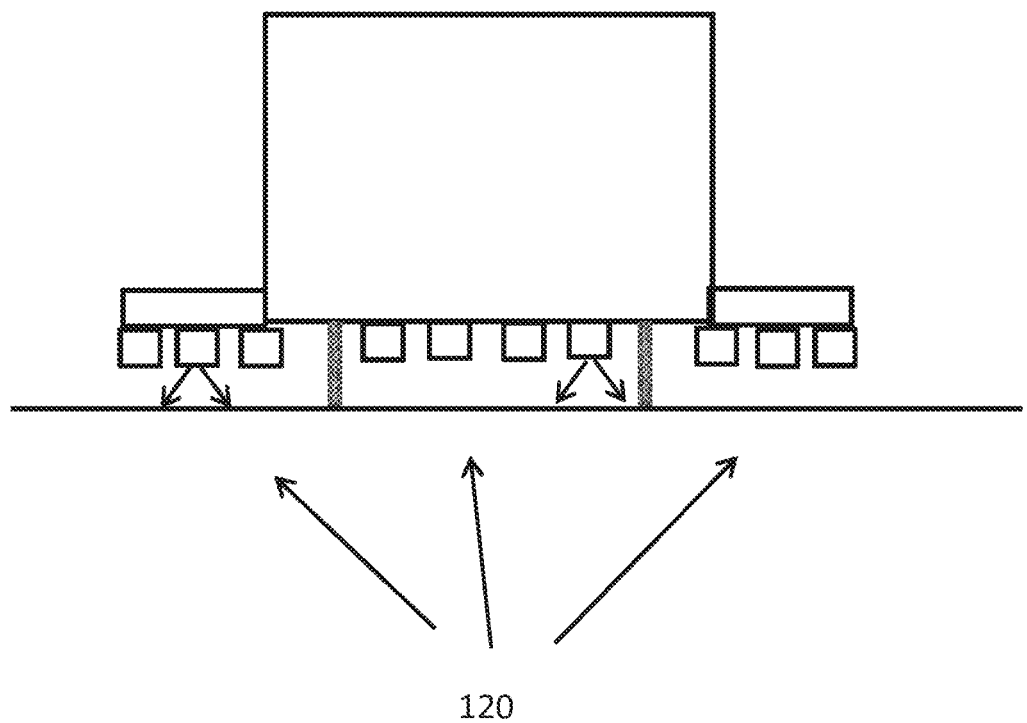
FIG. 7 shows a schematic set up of an example of a part of a system for weed control.

FIG. 7 shows a truck of a weed control train 130 as shown in FIGS. 4-5, that has a number of mulch application units 120. The truck in FIG. 7 can be any of the trucks shown in FIGS. 4-5 that has mulch application units 120a, 120 b or 120c. FIG. 7 shows a rear view of this truck of the train, with the view being that down the railway track. The processing unit 30 for example determines that specific weeds are required to have a mulch applied over them, with that mulch having a first herbicide content. Thus in this example, reference is made to the truck shown in FIGS. 4-5 that has mulch application units 140b. A number of separate mulch spray nozzles are shown, which are configured to spray a liquid biodegradable polymer that has contained within it the herbicide content. The polymer in this specific example is a polyester, which is a dispersion in an aqueous solution along with the herbicide. Following application, the water evaporates to leave the herbicide encapsulated within the polymer. The polymer is designed such that bacteria that are present in the environment and grow when weeds grow will degrade the polymer and lead to the release of the herbicide. Bacteria attack the ester group in the polymer leading to degradation of the polymer and release of the herbicide. Thus in addition to providing a physical barrier that controls the weed, a further weed control mechanism is provided that targets weeds via the controlled application of a weed control herbicide. If weeds are not growing, for example in cold and dry conditions, then the bacteria also do not grow and degrade the polymer. However, as soon as weeds start to grow the bacteria also grows leading to degradation of the polymer and the release of the herbicide. A number of separate spray nozzles of mulch application units 140b extend laterally beneath the train and to the sides of the train. The spray nozzles can also extend in a forward direction. A spray nozzle can itself have specific control, outside of being on or off, and can be directionally controlled to spray to the left and to the right or downwards, and/or to be controlled such that the angular extent of the spray is varied in order that for example a narrow jet of spray can be directed to a single weed. However, generally the extent of the application of a mulch is greater than the extent of the application of a weed control chemical that has been previously sprayed over a weed via chemical spray nozzles 140. However, the extent of mulch and weed control chemical spray can be the same.

In FIG. 7 there are two specific locations of a weed that has been determined to need a mulch applied over it. These locations are the same as the locations shown in FIG. 6 that have already had a weed control chemical sprayed over them. Thus, the weeds first have a weed control chemical sprayed over them, and then have a mulch having herbicidal content sprayed over them. However, in different examples a weed control chemical is first sprayed over a weed followed by application of a mulch that does not contain a herbicide. Such a mulch provides physical barrier effect to control weeds and can be a liquid polymer, which could also be biodegradable for reduced long term environmental impact but need not be. Such a mulch need not be in liquid form, and can be in granular or powder form, and the biodegradable mulch having herbicidal content can also be in granular or powder form rather than in liquid form.

Rather than use a liquid polymer mulch with a herbicide content, the mulch can be in the form of granules that can contain encapsulated herbicide if necessary, with these granules also being sprayable, thereby facilitating application. The granules can be biodegradable as discussed above in order to release encapsulated herbicide. Also, the mulch can be in a non-sprayable form, and again can have herbicidal content, being for example larger granules, non-woven fibre material, starch newspaper, that is physically applied at required locations.

Figure 8:
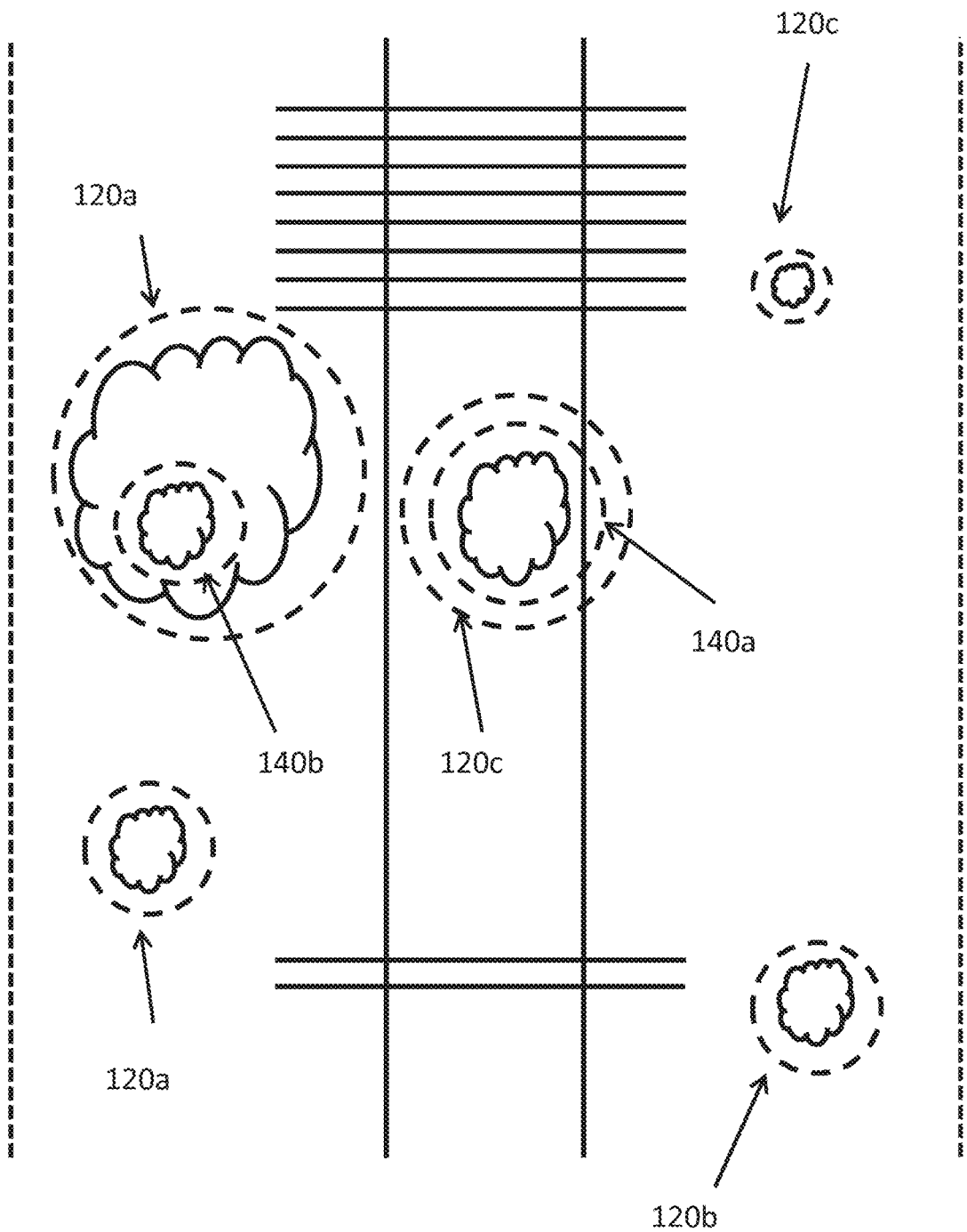
FIG. 8 shows a schematic representation of a railway track and surrounding area.

FIG. 8 shows a representation of a railway environment, showing the railway tracks and the ground to the side of the tracks. A number of weed areas are shown, with a large clump of one type of weed having a clump of a different type of weed within it. Shown in FIG. 8 are representations of the locations where different mulch application units and if necessary different chemical spray units have been activated to apply mulches and weed control chemicals respectively. At one location, the processing unit on the basis of image processing has determined that a weed is required to only have a mulch serving as a physical barrier applied over it, and only mulch application units 120a at the required location are activated. At another location, a second type of weed control chemical is required to be sprayed over a small clump of weeds in a larger clump of a different type of weed and again have the mulch without the herbicide applied over it. The larger clump itself can be controlled via application of only a mulch without herbicidal content. Two different clumps of weeds are determined on the basis of image processing to require mulches having herbicidal content without pre spraying with a weed control chemical. However, a further weed that is particularly difficult to control has a weed control chemical sprayed over it from chemical spray units 140a followed by application of a mulch with herbicidal content via mulch application units 120c. This determination of where and which mulch applications units should be activated to apply a mulch and if necessary which chemical spray nozzles should activate at locations of weed prior to application of a mulch can be considered to be the weed control map and/or feature discussed with respect to FIG. 4, or the real-time determination of what mode of weed control technology should be applied as discussed with respect to FIG. 5.

Figure 9:
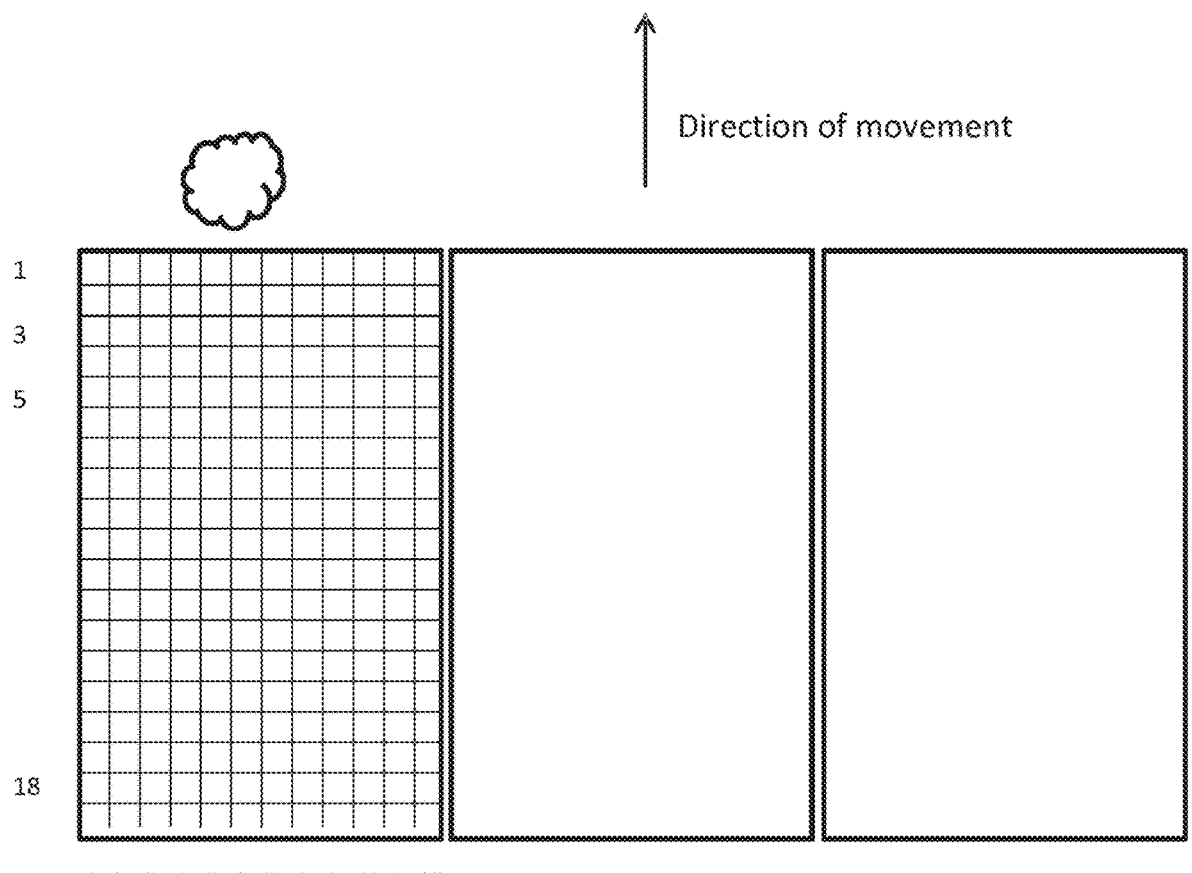
FIG. 9 shows a schematic set up of an example of a part of a system for weed control.

FIG. 9 shows more details of mulch applications units 120a in the left most truck of the train as shown in FIGS. 4-5, with the description below also relevant to the other mulch application units 120b and 120c and to the chemical spray units 140a and 140b. The layout and control of the mulch applications units (and for the chemical spray units) enables different amounts of mulch (and weed control chemical) to be applied (sprayed) at specific locations without having to slow the train down or apply mulch (weed control chemical) at different rates, leading to simplified system sub-units. Continuing with the specific example shown in FIG. 9, there is shown separate sub-units that are mounted to the truck of the train, with the centre unit beneath the train truck and the other sub-units to the side of the truck that can control weeds outsides of the tracks. In this specific example there are 19 rows of nozzles and 12 columns of nozzles configured to apply a mulch in liquid form as a polymer, which does not have a herbicidal content (although the same system can be used to apply a liquid polymer mulch having a herbicide content, a granule mulch with or without herbicidal content, and a weed control chemical). There can be various numbers of columns of nozzles and various row numbers, and there may only be one row. Defining a coordinate system as row×column, then as the train moves forward nozzles 1×4, 1×5, 1×6 and 1×7 activate as these nozzles pass over the location of the weed to deposit a mulch layer. With further movement, in an example only these nozzles are active until these nozzles have passed over the weed. In this way a minimum amount of mulch can be applied. However, the nozzles can activate as the weed is located at different positions beneath the sub-unit. Thus, when the weed is first located under the front edge of the sub-unit nozzles 1×4-7, 2×4-7 and 3×4-7 are activated. As the train moves forward, 2×4-7, 3×4-7 and 4×4-7 are activated, then 3×4-7, 4×4-7 and 5×4-7 are activated. In this way, the weed progresses under the sub unit and at all positions the appropriate nozzles are activated until 17×4-7, 18×4-7 and 19×4-7 are activated, then 18×4-7 and 19×4-7 and finally 19×4-7 are activated. In this way a wave of activated nozzles activates at a fixed position on the ground, with the wave moving at the speed of the train. Thus different durations of application of mulch, and hence different thicknesses of mulch, can be applied at different locations, where the processing unit determines what thickness of mulch is to be deposited for a particular weed at a particular location. This also applies to the application of mulches having herbicidal content, and to the amount of weed control chemical to be sprayed over weeds prior to application of a mulch, if it has been determined by the processing unit that such a pre-treatment by weed control chemical is required.

The above detailed examples have been discussed with respect to a railway, where different mulch application units and chemical spray units are housed in different trucks of the train. These could be housed in a single truck, and there could be just one set of units, with these being mulch applications units applying mulch at specific locations on the basis of image processing, either with or without associated herbicidal content. Additionally, rather than a weed control train, a truck or lorry or Unimog can have mulch applications units and if necessary chemical spray units mounted on/within it an, on the basis of previously acquired and processed imagery or on the basis of imagery it acquires and processes itself, drives around an industrial area or even an area such as an airport and controls weeds through the targeted application of mulch, with a weed control chemical pre-treatment being applied if necessary as discussed above.

In another exemplary embodiment, a computer program or computer program element is provided that is characterized by being configured to execute the method steps of the method according to one of the preceding embodiments, on an appropriate system.

The computer program element might therefore be stored on a computer unit, which might also be part of an embodiment. This computing unit may be configured to perform or induce performing of the steps of the method described above. Moreover, it may be configured to operate the components of the above described apparatus and/or system. The computing unit can be configured to operate automatically and/or to execute the orders of a user. A computer program may be loaded into a working memory of a data processor. The data processor may thus be equipped to carry out the method according to one of the preceding embodiments.

This exemplary embodiment of the invention covers both, a computer program that right from the beginning uses the invention and computer program that by means of an update turns an existing program into a program that uses invention.

Further on, the computer program element might be able to provide all necessary steps to fulfill the procedure of an exemplary embodiment of the method as described above.

According to a further exemplary embodiment of the present invention, a computer readable medium, such as a CD-ROM, USB stick or the like, is presented wherein the computer readable medium has a computer program element stored on it which computer program element is described by the preceding section.

A computer program may be stored and/or distributed on a suitable medium, such as an optical storage medium or a solid state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. An apparatus configured to inhibit the growth of vegetation, comprising:
   an input unit;
   a processing unit; and
   an output unit;
   wherein the input unit is configured to provide the processing unit with at least one image of an environment;
   wherein the processing unit is configured to analyse the at least one image to determine at least one location of vegetation for activating at least one mulch application unit;
   wherein the at least one mulch application unit is mountable on a train configured to carry at least one mulch;
   wherein the mulch application unit, in a train-mounted configuration, is configured to receive the at least one mulch on the train;
   wherein the train is mountable on a railway track;
   wherein the train comprises a plurality of train cars coupled together;
   wherein the at least one mulch application unit is configured to apply the at least one mulch from the train to the at least one location of vegetation to inhibit growth of the vegetation;
   wherein the at least one location of vegetation is on the railway track, adjacent the railway track, or both; and
   wherein the output unit is configured to output information useable to activate the at least one mulch application unit to apply the at least one mulch, from the train, to the at least one location of vegetation.

2. The apparatus of claim 1, wherein the at least one image was acquired by at least one camera, and wherein the input unit is configured to provide the processing unit with at least one location associated with the at least one camera when the at least one image was acquired.

3. The apparatus of claim 1,
   wherein the processing unit is configured to determine a mode of operation of at least one chemical spray unit for spraying a herbicide at the at least location of vegetation based on at least one analysed image,
   wherein the at least one chemical spray unit is mountable on the train, and
   wherein a time of spraying the herbicide from the at least one chemical spray unit is prior to a time of applying the at least one mulch, and wherein the output unit is configured to output information useable to activate the at least one chemical spray unit.

4. The apparatus of claim 3, wherein to determine the mode of operation comprises determining a herbicide to be sprayed from a plurality of herbicides.

5. A system configured to inhibit the growth of vegetation, comprising:
   at least one camera;
   an apparatus configured to inhibit the growth of vegetation; and
   at least one mulch application unit;
   wherein the at least one camera is configured to acquire the at least one image of an environment;
   wherein the at least one mulch application unit is mountable on a train configured to carry at least one mulch;
   wherein the mulch application unit, in a train-mounted configuration, is configured to receive the at least one mulch on the train;
   wherein the train is mountable on a railway track;
   wherein the train comprises a plurality of train cars coupled together;
   and
   wherein the apparatus is configured to:
      analyse the at least one image of an environment to determine at least one location of vegetation within the environment for activating at least one mulch application unit, wherein the at least one location of vegetation is on the railway track, adjacent the railway track, or both, and
      activate the at least one mulch application unit to apply the at least one mulch from the train to the at least one location of vegetation to inhibit growth of the vegetation.

6. The system of claim 5,
   wherein the system comprises at least one chemical spray unit for spraying a herbicide at the at least one location of vegetation based on the at least one analysed image,
   wherein the at least one chemical spray unit is mountable on the train, and
   wherein a time of spraying the herbicide from the at least one chemical spray unit is prior to a time of applying the at least one mulch.

7. A method inhibiting the growth of vegetation, comprising:
   providing a processing unit with at least one image of an environment;
   analysing by the processing unit the at least one image to determine at least one location of vegetation within the environment for activating at least one mulch application unit mounted on a train carrying at least one mulch,
      wherein the mulch application unit is configured to receive the at least one mulch on the train,
      wherein the at least one mulch application unit is configured to apply the at least one mulch from the train to the at least one location of vegetation to inhibit growth of the vegetation,
      wherein the at least one mulch application unit is mountable on the train,
      wherein the train is mountable on a railway track,
      wherein the train comprises a plurality of train cars coupled together, and
      wherein the at least one location of vegetation is on the railway track, adjacent the railway track or both; and
   outputting information by an output unit that is useable to activate the at least one mulch application unit to apply the at least one mulch from the train to the at least one location of vegetation.

8. The method of claim 7, wherein the at least one image was acquired by at least one camera, and wherein providing the processing unit with at least one image comprises providing the processing unit with at least one location associated with the at least one camera when the at least one image was acquired.

9. The method of claim 7, comprising:
   analysing by the processing unit the at least one image to determine a mode of operation of at least one chemical spray unit for spraying a herbicide at the at least one location based on the at least one analysed image, wherein a time of spraying the herbicide from the at least one chemical spray unit is prior to a time of applying the at least one mulch; and wherein outputting the information by the output unit comprises outputting information useable to activate the at least one chemical spray unit.

10. The method of claim 9, wherein to determine the mode of operation of at least one chemical spray unit for spraying the herbicide comprises determining a herbicide to be sprayed from a plurality of herbicides.

11. The apparatus of claim 1, wherein the processing unit is further configured to determine at least one type of weed at the at least one location of vegetation.

12. The system of claim 5, wherein the apparatus is further configured to determine at least one type of weed at the at least one location of vegetation.

13. The method of claim 7, further comprising analysing the at least one image by the processing unit to determine at least one type of weed at the at least one location of vegetation.

14. The apparatus of claim 1, wherein the at least one mulch comprises a mulch devoid of herbicide.

15. The apparatus of claim 1, wherein
the at least one mulch application unit belongs to a plurality of mulch application units,
wherein the plurality of mulch application units comprises a first mulch application unit and a second mulch application unit;
wherein the at least one mulch application unit is configured to apply the at least one mulch to the at least one location of vegetation from the first mulch application unit, or the second mulch application unit, or both to inhibit growth of the vegetation;
wherein the at least one mulch comprises a first mulch and a second mulch;
wherein the first mulch differs from the second mulch; and
wherein the first mulch application unit is configured to apply the first mulch and the second application unit is configured to apply the second mulch.

16. The apparatus of claim 1, wherein the input unit is mounted on a drone, a plane, a satellite, or a second train, wherein the train is a first train and the second train precedes the first train, or any combination thereof.

17. The apparatus of claim 3, wherein the plurality of train cars comprise a first set and a second set, each of the first set and the second set comprising at least one train car, wherein the at least one chemical spray unit is mounted on the first set, the at least one mulch application unit is mounted on the second set, and wherein the first set precedes the second set in the plurality of train cars.

18. The apparatus of claim 17, wherein the plurality of train cars comprises a leading car, wherein the leading car precedes the first set, and the first set proceeds the second set in the plurality of train cars, and wherein the input unit is mounted on the leading car.

19. The system of claim 6, wherein the plurality of train cars comprise a first set and a second set, each of the first set and the second set comprising at least one train car, wherein the at least one chemical spray unit is mounted on the first set, the at least one mulch application unit is mounted on the second set, wherein the first set precedes the second set in the plurality of train cars.

20. The system of claim 19, wherein the plurality of train cars comprises a leading car, wherein the leading car precedes the first set, and the first set proceeds the second set in the plurality of train cars and, wherein the camera is mounted on the leading car.

\* \* \* \* \*